No. 606,787. Patented July 5, 1898.
C. W. KERSTETER.
DUPLEX INDUCTION VALVE FOR AUTOMATIC SPRINKLERS.
(Application filed Aug. 31, 1897.)
(No Model.) 2 Sheets—Sheet 1.

Witnesses:
W. F. Fouse
A. F. Bartges

Inventor:
Charles W. Kersteter:
by Humphrey & Humphrey
Attys.

No. 606,787. Patented July 5, 1898.
C. W. KERSTETER.
DUPLEX INDUCTION VALVE FOR AUTOMATIC SPRINKLERS.
(Application filed Aug. 31, 1897.)
(No Model.) 2 Sheets—Sheet 2.

Witnesses:
W. F. Fouse
A. F. Bartges

Inventor:
Charles W. Kersteter
by Humphrey & Humphrey
Attys.

UNITED STATES PATENT OFFICE.

CHARLES W. KERSTETER, OF AKRON, OHIO, ASSIGNOR TO THE NIAGARA FIRE EXTINGUISHER COMPANY, OF SAME PLACE.

DUPLEX INDUCTION-VALVE FOR AUTOMATIC SPRINKLERS.

SPECIFICATION forming part of Letters Patent No. 606,787, dated July 5, 1898.

Application filed August 31, 1897. Serial No. 650,099. (No model.)

*To all whom it may concern:*

Be it known that I, CHARLES W. KERSTETER, a citizen of the United States, residing at Akron, in the county of Summit and State of Ohio, have invented a certain new and useful Improvement in Duplex Induction-Valves for Automatic Sprinklers, of which the following is a specification.

My invention has a general relation to that system of automatic sprinklers for extinguishing fires in the interiors of buildings in which a series of pipes containing compressed air extended through the building and provided with sprinkling-jets normally closed by means of a metal fusible at a low temperature is connected with a pipe containing water under pressure, the entrance of which water is prevented by a valve that is kept closed by devices actuated by the air-pressure in the pipes, and which valve is arranged to be forced open by the water-pressure upon the release of the retaining devices when the air-pressure is reduced by the opening of any of the sprinkling-jets; and it has especial relation to improvements in the valve and the retaining and releasing mechanism that holds the water in the main water-supply pipe from entering the series of pipes holding the jets. An objection has been found in valves heretofore used for this purpose from water accumulating on the valve and forming a water column that reduces the sensitiveness of the valve and obstructs its operation.

The object of my invention is to overcome this objection and to produce a highly-sensitive valve that shall be simple in construction, effective in operation, and not liable to derangement.

To the aforesaid object my invention consists in the peculiar and novel construction, arrangement, and combination of parts hereinafter described and then specifically pointed out in the claims, reference being had to the accompanying drawings, forming a part of this specification.

Figure 2:
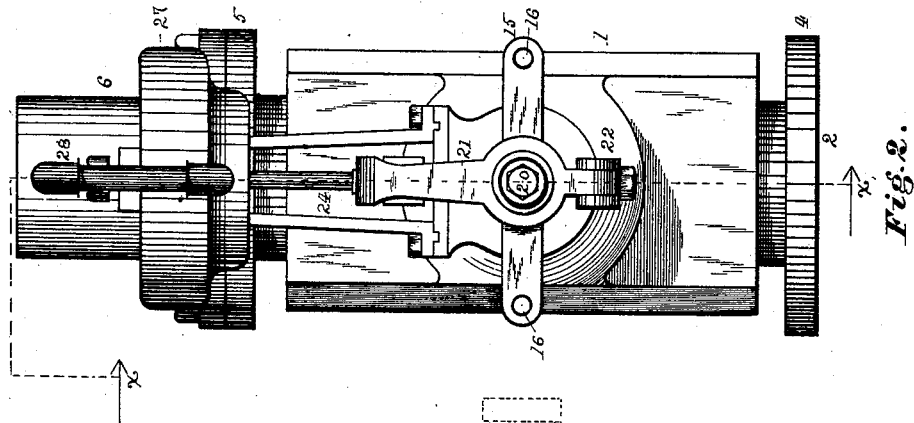
Figure 1:
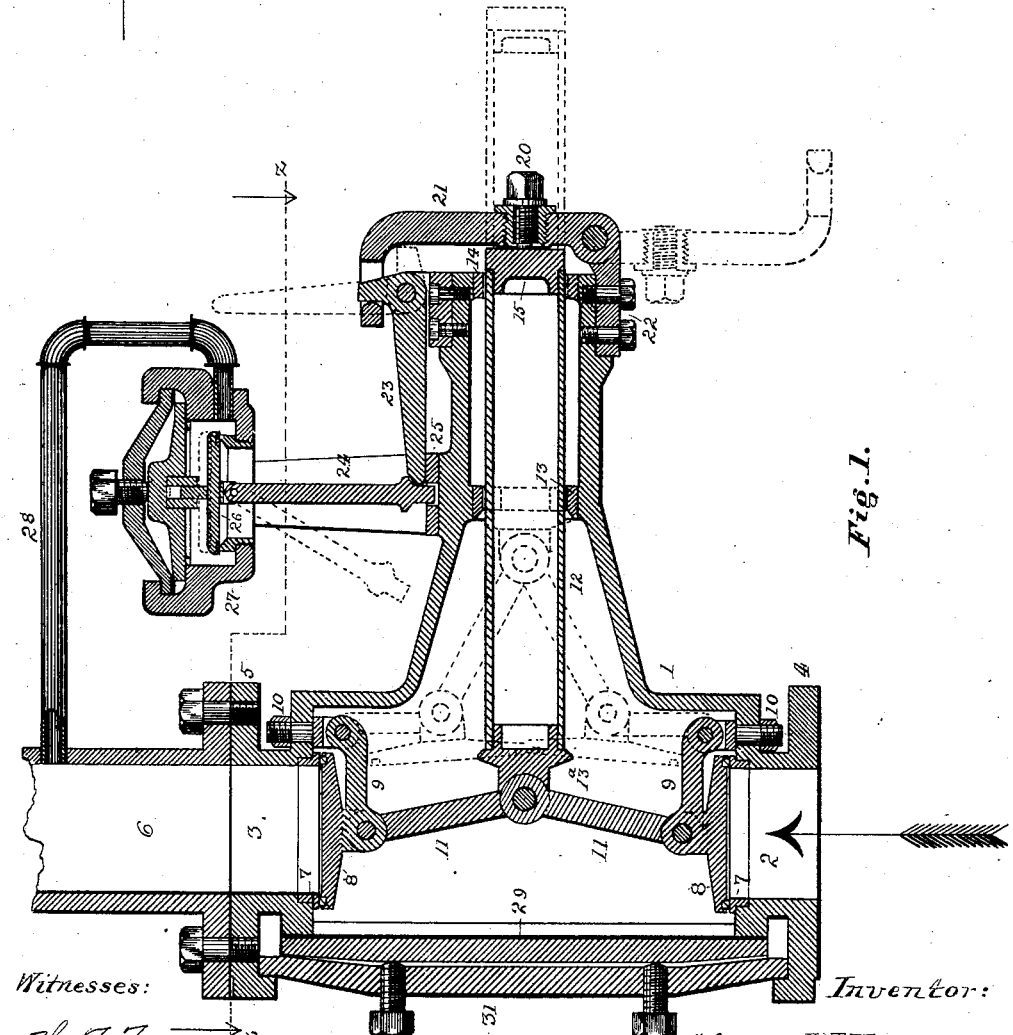
Figure 3:
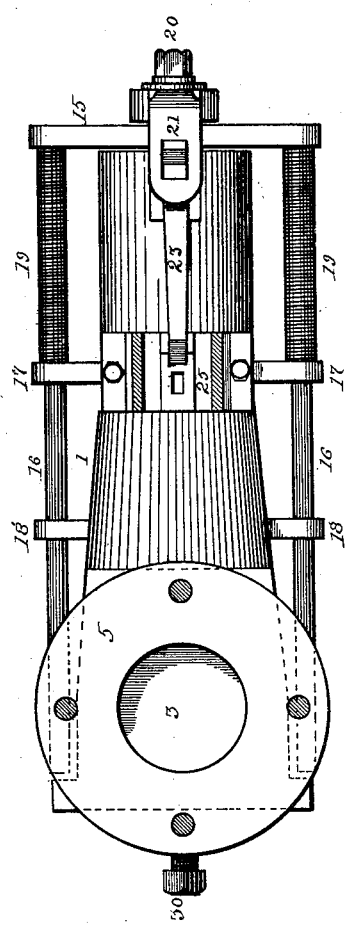

In the accompanying drawings, in which similar reference-numerals indicate like parts in the different views, Figure 1 is a vertical longitudinal section of my improved valve at the line $x\,x$ of Fig. 2. Fig. 2 is a plan view, and Fig. 3 an elevation looking from the right of Fig. 1.

The valve-case 1 has the general outline of a T-coupling, the openings 2 3 being provided with flanges 4 5, by which it is connected with the water-supply pipe and with the pipe 6, leading to the sprinklers, respectively. The openings 2 3 are provided with valve-seats 7 7, closed by valves 8 8, integral with swinging arms 9 9, hinged to the inner ends of bolts 10 10, fastened in the case. These valves are connected together by links 11 11, pivotally connected together and with the end of a hollow follower 12, that slides in the horizontal arm of the case in guide-rings 13 14, the first of which, 13, has its opening made conical to constitute a valve-seat for the enlarged portion $13^a$ of the follower 12 to rest on in the manner and for the purpose hereinafter described.

The follower 12 is hollow for the purpose of lightness, and its outer end extends outside the case 1 and bears a cross-head 15, to which are attached two guide-rods 16, that run in guides 17 18 on the frame, and on these rods, between the cross-head and the guide 17, are coiled springs 19, that constantly press the cross-head outward.

The follower 12 is pressed inward and the springs 19 held compressed by a set-screw 20 in a yoke 21, pivotally attached at one end to a bracket 22 on the case 1. The opposite end of the yoke 21 is bent, and in the bent portion is a slot to engage the shorter arm of a bell-crank lever 23, pivotally attached to the bracket on the opposite side of the arm of the case 1. The longer end of the lever 23 is held down by a beveled head or rim on a stem 24, one end of which enters a slot in a plate 25, attached to the case 1, which retains it when it is pressed downward. The opposite end of the stem 24 is pivotally connected to a valve 26, that closes a valve-opening in the under face of a valve-chest 27. This chest is arranged to be closed by a detachable cover and clamp, and its interior is connected with the pipe 6 by a tube 28.

The operation of the apparatus is as follows: The parts being in the position shown in the dark lines and the system of pipes bearing the sprinklers, with the pipe 6 and chest 27, being charged with compressed air, the parts will remain in that position by reason of the pressure on the valve 26 constantly forcing it outward, and thus holding the end of the stem 24 in the slot in the plate 25. When any sprinkler-jet is released by its fusible binder, as in the event of fire, the air-pressure in the chest 27 will decrease by the escape of air and permit the valve 26 to yield to the pressure of the lever 23, due to the water-pressure exerted against the valves 8 and communicated through the follower 12 and yoke 21, and thus permit the stem 24 to draw out of the slot in the plate 25 and swing away in the position shown in dotted lines in Fig. 1. This in turn permits the lever 23 to rock upward and release the yoke 21, which rocks downward and frees the follower 12, which slides outward as the valves 8 open until its enlarged portion 13$^a$ rests on the guide-ring 13, and thus closes all leakage through the horizontal arm. The parts by these operations assume the position indicated by dotted lines in Fig. 1, and the water passes directly from the main supply-pipe 2 to the jet-supply pipe 6 and its connected series of pipes and sprinkling-jets.

In the foregoing operation the springs 19 subserve the function of aiding the water-pressure to complete the opening of the valves 8 and to retain them against closing when open. By this arrangement I secure certain advantages. From the position and connection of the valves 8 the water-pressure in the main water-supply pipe tends to close the opposite valve-opening into the jet-supply pipe, and the effect of a water column in the jet-supply pipe operates to open the valves 8 instead of to close them, as its pressure is directly against the inner face of the valve.

For facility of arranging the parts and for inspecting and cleaning them the case 1 is open at the back and is closed by a door 29, retained by screws 30 in a clamp 31, whose ends rest in notches in the flanges of the case.

Having thus described my invention, what I claim, and desire to secure by Letters Patent, is—

1. In a valve for automatic sprinklers the combination with a cylindrical case having oppositely-disposed water-supply and jet-supply openings, and a perpendicular branch intermediate of said openings; valves to close said openings, intermediate links connected together and with said valves; a follower connected with said links and arranged to slide in said branch, a cross-head on said follower, of springs connected with and arranged to press said follower outward, a yoke to retain said follower, latch to retain said yoke, and trip mechanism arranged to be actuated by a decrease of pressure in the jet-supply pipes and to release said latch, substantially as shown and described.

2. An improved valve for automatic sprinklers consisting of a cylindrical case adapted to have its ends connect with the water-supply pipe and jet-pipe system respectively, and provided with valve-seats adjacent to its ends, and a hollow sleeve perpendicular to and between said ends, with valves adapted to close said valve-seats, hinged in said case and arranged to swing inwardly, two links severally connected with said valves, hinged at their opposite ends to each other; a follower hinged to the links at their joint and extending in and through said sleeve; a beveled ring on said follower, and a counter-ring in said sleeve to form a valve therewith; a cross-head on the outer end of said follower, and parallel rods extending thence in guides beside said sleeve; coiled springs on said rods to constantly press said cross-head outward; a yoke to hold said follower inward; a latch to retain said yoke, an arm to hold said latch; a valve-case connected with the jet-pipes, and a valve therein arranged to be held outward by the pressure in said jet-pipes, connected with said latch-holding arm and arranged to move inward with said valve and release the yoke-holding latch, all constructed and arranged substantially as shown and for the purpose specified.

In testimony that I claim the above I hereunto set my hand.

CHARLES W. KERSTETER.

In presence of—
C. P. HUMPHREY,
C. E. HUMPHREY.